United States Patent [19]
Montgomery et al.

[11] 3,765,105
[45] Oct. 16, 1973

[54] MULTIPLE PLAY OR INSTRUCTIONAL DEVICE

[75] Inventors: Harold S. Montgomery, Fox Point; Roger J. Budnik, Milwaukee, both of Wis.

[73] Assignees: David J. Nutting; Phyllis M. Nutting, both of Bayside, Wis.

[22] Filed: Nov. 19, 1970

[21] Appl. No.: 91,094

[52] U.S. Cl. ................................................ 35/9 A
[51] Int. Cl. ............................................. G09b 7/08
[58] Field of Search ..................... 35/9 R, 9 A, 9 B, 35/48 R; 273/1 E

[56] References Cited
UNITED STATES PATENTS

| | | | |
|---|---|---|---|
| 2,562,179 | 7/1931 | Dorf | 35/48 R |
| 2,654,163 | 10/1953 | Reynolds | 35/9 B |
| 2,835,052 | 5/1958 | Raich et al. | 35/9 B |
| 3,300,875 | 1/1967 | Nisbet | 35/9 B |
| 3,541,700 | 11/1970 | Montgomery | 35/9 A |

Primary Examiner—Wm. H. Grieb
Attorney—Andrus, Sceales, Starke & Sawall

[57] ABSTRACT

A dual play game has a separate input for each player. A film projector presents a question and answers and the players can select from a series of answers. A correct selection obtains a related score and actuates a drive relay to present the next question. An incorrect selection operates an indicator for that player. After a selected time, the projector presents a new question. A diode matrix board includes selectively interconnected lines connected to a double wafer stepping switch and to the game operating circuit to sequence each answer. One wafer controls the input matrix and the second wafer controls an output matrix. The stepping switch cycles through all positions for each question to provide the desired sequencing control.

32 Claims, 3 Drawing Figures

MULTIPLE PLAY OR INSTRUCTIONAL DEVICE

BACKGROUND OF THE INVENTION

This invention relates to an instructional device and particularly to such a device which submits stimulus information and related response information and permits selection of a proper response on a plurality of distinctly different response means to permit a plurality of different persons to simultaneously operate the instructional device.

Mechanical teaching devices have been suggested wherein stimulus information is presented in a form of questions simultaneously with the presentation of a plurality of answers or responses, one of which is a proper response or answer. The multiple choice type question and answer devices have been developed not only for classroom and formal presentation but also as game-type devices which can be employed in public amusement establishments. The latter will normally require some form of a coin operation or the like. A highly satisfactory teaching device is shown in applicant's co-pending application entitled "Instructional Device", which issued as U.S. Pat. No. 3,541,700 as of Nov. 24, 1970 and which was assigned to a common assignee with the present application. In the system of that application, the instructional device is established for a single person, student or player. For amusement purposes, it provides for a coin input which automatically permits the player to select any one of a plurality of categories. Having selected a category, a series of questions simultaneously with possible different answers for each question are presented in time spaced relationship. The student or player selects an answer by depressing one of a plurality of related pushbutton units which creates an output indicating whether a proper or improper answer has been selected. If the first selection is proper, the device will rapidly program to the next question. If it is improper, however, the switching system is interlocked to permit continued selection of another answer. If the second selection is incorrect or correct, the circuit is such that it will rapidly program to the next sequence or question. This provides restricting of the player to a predetermined number of selections or the like.

SUMMARY OF INVENTION

The present invention is particularly directed to a multiple choice teaching device wherein more than one student or player may operate the device in response to the same stimulus information and particularly in a competitive manner. Generally, a correst response by a first player disconnects the other player's response means and preferably provides a rapid presentation to the next question. Simultaneously, the proper selection by the particular player may be recorded. If an incorrect response is selected by a first player, the first player response means is operatively disconnected without interfering with the opportunity for the other player or players to select a proper answer.

In accordance with a further novel aspect of the present invention, the instructional device is provided with a unique control circuit including a sequencing control unit such as a stepping switch interconnected through a switching matrix unit having unidirectional conducting means such as solid state diodes to establish a presentation control sequence. Generally, the matrix unit includes an input diode matrix board to control the sequencing in response to an initial input and an output diode matrix board which establishes the operation of various drives, relays and the like to provide controlled input to the input matrix lines. The stepping switch includes a movable contact means which sequentially scans the leads of the input matrix and the output matrix for each question and provides a predetermined sequencing with respect to time, scoring and the like. The matrixing is preferably of the plug-in diode type board such as to permit a versatile and readily varied input and output arrangement. The dual board control further permits convenient servicing of the system.

In accordance with a preferred and novel construction of the present invention, a control circuit includes two input banks, each of which is similarly constructed with a plurality of input control switch means to permit the individual players to arbitrarily and individually select one of a plurality of responses including one correct response. The input switch means include first contact means which are interconnected with each other to conjointly control a selection means or individually control the several branches of a response selection means with a separate branch being provided for each possible selection. The first player to select a proper answer actuates an associated correct response circuit means to record the proper selection and to simultaneously cut out the opposing player's response circuitry. Separate incorrect response circuits are provided for each player such that an improper selection does not, in any way, affect the control circuitry of the opposing player. However, an incorrect response is preferably interconnected into the corresponding incorrect response circuitry to lock out that player's control circuit and maintain it in an incorrect response condition until a new question is presented.

The game sequence is controlled by a dual wafer stepping switch unit having 12 positions for each wafer. The one contact wafer controls an input matrix and has a stepped contact sequentially engaging 12 contacts or terminals of an input diode matrix. The second contact wafer correspondingly is constructed with a movable contact sequentially engaging 12 contacts or terminals of an output diode matrix. The play is initiated through a suitable control input which will normally be coin-operated for amusement purposes. This initiates the stepping of the stepping switch unit. The input matrix is responsive to the closure of the output matrix control and selection control circuit to provide for automatic stepping from one to the next position of the 12-position stepping switch. The output matrix, in turn, controls the energizing of the drive means and the operating selection circuit. Thus, after the first step, the input circuit is locked in a standby position awaiting the response of the output matrix circuit. In the second position, the output matrix circuit applies a signal to advance the questions and, in particular, to actuate a control circuit to energize the projector lamp and projector motor and simultaneously to step the stepping switch unit. At the end of the stepping period, the projector control relay automatically again actuates the input matrix circuitry to provide a further stepping of the stepping switch which, in a particular construction, is provided with automatic stepping positions to provide stepping to a sixth position in which time the projector lamp is illuminated to project the desired question and a timer is inserted into the circuit through the output matrix. The operating relay in this position is selected to turn on not only the projector lamp but to energize the player selection circuitry which may be indicated through the illumination of an appropriate lamp means. When either of the operators select a proper response, the player related recording and scoring circuitry is activated through the output matrix, the opposing player's opportunity to establish a proper response is automatically cut out, and simultaneously the stepping input matrix is activated to drive the stepping switch unit to the next position. The input matrix automatically steps to the next two positions to establish the scoring and indication of the correct score, and then automatically through the final position to condition the circuit for recycling with the projector and the selection circuits reset. The apparatus then presents the next question and re-establishes the sequence for the second question.

If an improper selection has been made by one player, that player cannot now obtain a correct response until the opponent has had an opportunity and makes a selection. If the other player also selects a wrong answer, the score is reduced and both players are given a second turn to obtain a reduced score response. A timer is energized simultaneously with the initiation of the answer period and automatically times out after a predetermined selected time. Thus, if the players do not complete their attempts within the preset time, the circuit automatically drives the stepping switch unit back to the number one position through the input diode matrix, thereby re-establishing and presenting the next question. That question is, therefore, lost and neither player can score and the game proceeds to the next question. With the presentation of the final question, a cutoff means is energized and conditions the circuit such that at the final position of the stepping switch, the interlocking circuit to the stepping switch unit is broken and the unit steps back and maintains itself in the first position. The apparatus must then be reset through the main control as the input of another coin.

The present invention thus provides a highly improved sequencing control system through the use of the input-output matrix circuits and, furthermore, construction of a dual-play control circuitry which permits competition between a plurality of players.

BRIEF DESCRIPTION OF DRAWINGS

The drawings furnished herewith illustrate the best mode presently contemplated by the inventor for carrying out the subject invention in which the above advantages and features are clearly disclosed as well as others which will be readily understood from the following description.

In the drawings.

DESCRIPTION OF ILLUSTRATED EMBODIMENT

Figures 1, 2:
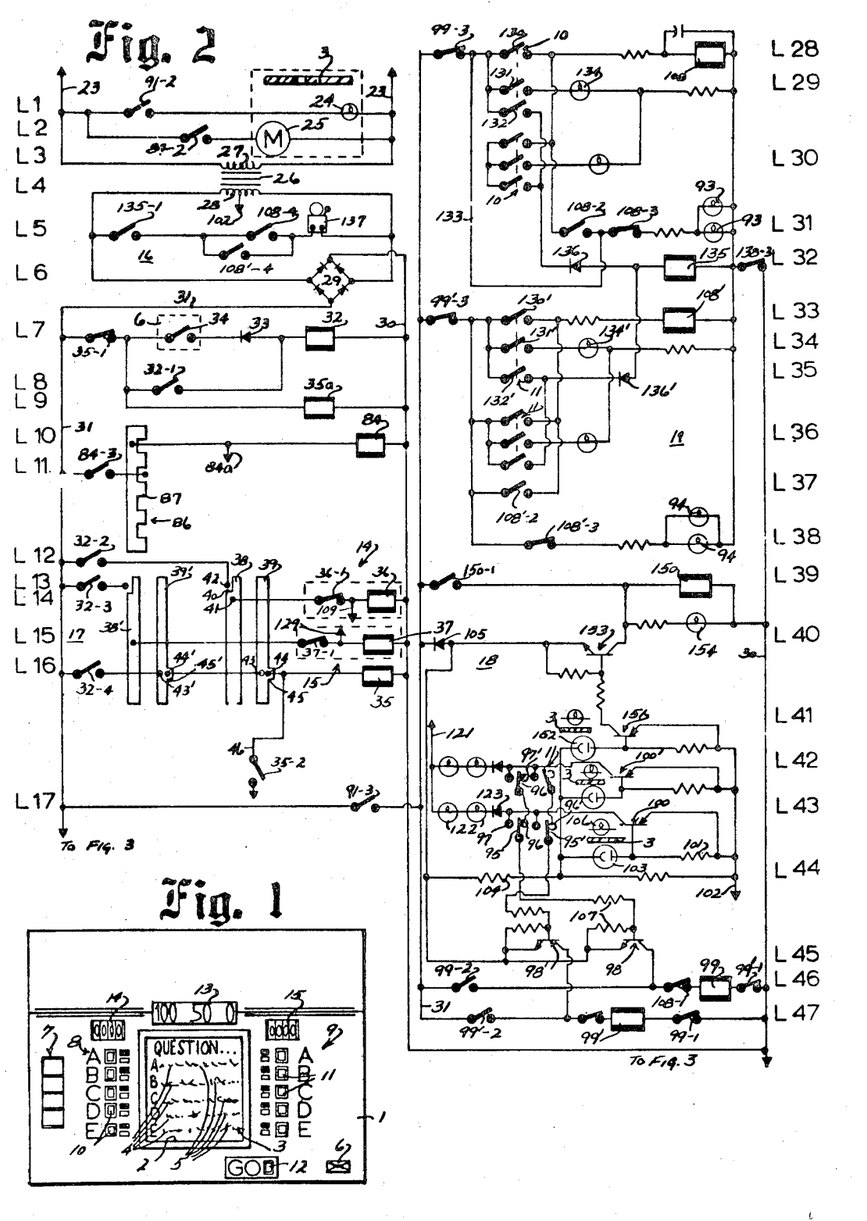
FIG. 1 is a diagrammatic illustration of a multiple choice question and answer device presentation means.
FIG. 2 is a schematic circuit diagram of a portion of the control circuit constructed in accordance with the present invention for carrying out the presentation of questions and answers in a programmed sequence for dual player response and selection.

Referring to the drawing and particularly to FIG. 1, the present invention is illustrated in connection with a multiple choice question and answer game which may be played by two players. The illustrated game device includes a front housing or panel 1 behind which the control and drive components such as shown in FIG. 2 are housed. Generally, the presentation panel 1 includes a centrally located viewing opening 2 past which film strip 3 is stepped in a predetermined sequence. At each step, the film strip presents stimulus information and a plurality of bits of associated response information. As illustrated in FIG. 1, a question 4 is presented in the top of the viewing opening 2. Five possible answers 5 are listed on the film immediately below the question. The initial presentation or drive of the film strip in the presentation of a question 4 and the associated answers 5 may be selectively controlled through a suitable main on-off device and in connection with a game device, will normally be responsive to a coin input or receiver 6. Thus, the apparatus is adapted to respond to a given amount of money and may be responsive to one or more selected coins which are operative to establish a power connection to the device with an automatic operation of the drive of the film strip 3 for the presentation of a series of questions 4 and related answers 5 in a predetermined programmed sequence. As more fully disclosed in applicant's copending application, a category selection means 7 is desirably provided such that the players can select any one of several different areas of information such as general knowledge, sports, movies or the like. The players would have to agree on which particular category they desired to compete in. They would then actuate the associated category selection means 7 to determine the category in which the game or material is to be presented. Insertion of the coins into receiver 6 will automatically actuate the film drive as subsequently described and position the film strip 3 with respect to the viewing opening 2 to present the first of a given number of questions and simultaneously present the possible answers. The players can select any one of the five possible answers through separate and player-related answer selection switch banks 8 and 9, one for each of the players. Each of the switch banks 8 and 9 is similarly constructed and bank 8 includes five pushbutton switch units 10, one for each of the possible answers and bank 9 similarly includes five units 11. The pushbutton switch units 10 and 11 of each of the answer selection banks 8 and 9 are multiple contact units, as shown in FIG. 2, and establish an interrelated control to provide an indication of a proper selection and/or an improper selection and, furthermore, to indicate which of the players has properly selected or improperly selected the responses. A main start switch unit 12 is provided to allow initiation of the presentation of the first question and answer. A score display 13 indicates the possible score and individual score units 14 and 15 for each player accumulates the respective scores obtained. In operation, the first question and possible answers are presented and the players select a desired answer. If a correct answer is selected by the one player, the device automatically records the score on the player-related visual display unit 14 such as an automatic number scorer. This also immediately triggers the device to present the next questions and answers. If an improper selection is made, the device automatically locks out that player's selection control unit without interrupting the opposite player's selection unit. The latter player may then make a selection and if it is proper, it will be displayed on his interrelated visual display unit 14. If both players, within an allotted time, select an improper answer, the circuit will reset and allow each player to make a second selection at a reduced score, indicated on unit 13. If they do not complete their selections within the allotted time for that question, the device will automatically sequence to the second question and answer. The apparatus will continue the above cycle until all of the questions have been presented in a corresponding manner. For example, the program may include eight separate questions. At the end of that time, the apparatus will reset to stand by and require receipt of a further coin in the receiver 6 in order to again operate the apparatus.

Figure 3:
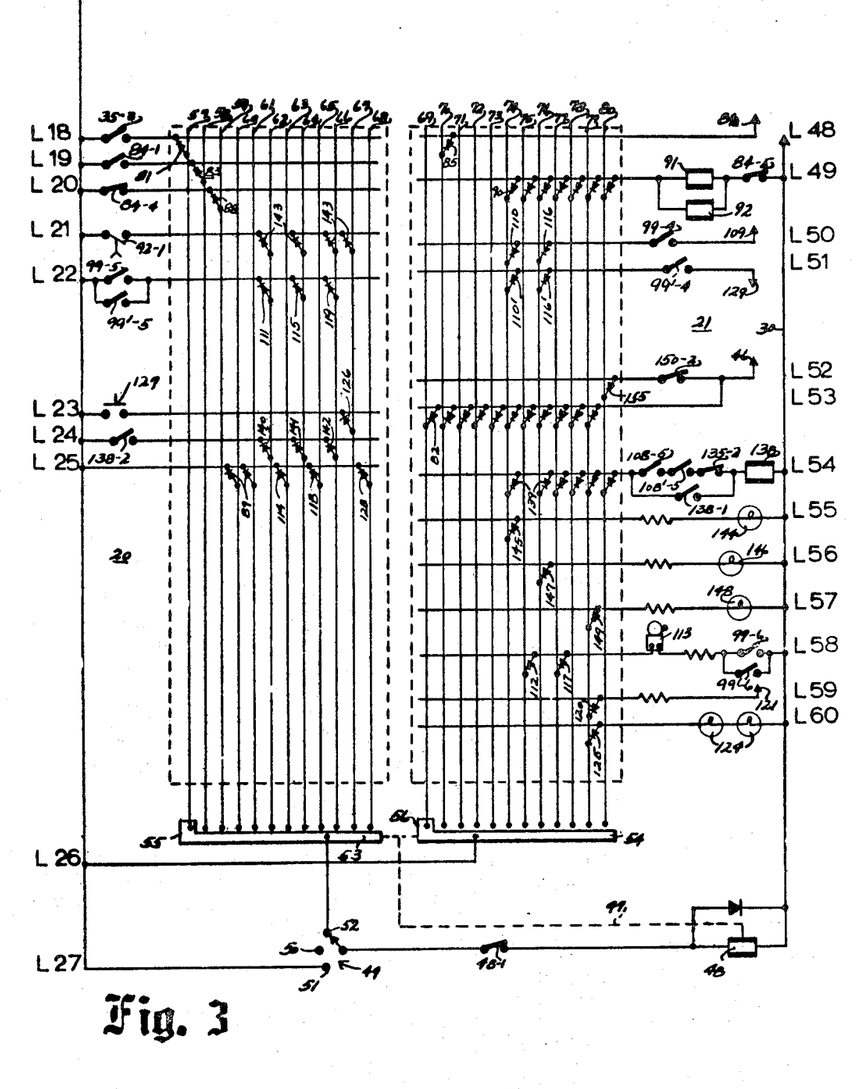
FIG. 3 is a continuation of FIG. 2.

A preferred construction for interconnecting the several switch banks 8 and 9 into a control apparatus is shown in FIGS. 2 and 3. In FIG. 2, the related answer control circuitry and a pair of the switch units 10 and 11 is shown in each of the banks 8 and 9 for simplicity and clarity of explanation. The three additional switch units to provide for five selections would be similarly added into the circuit and as such further illustration is not necessary to a full, complete understanding of the present invention, the additional switch banks are not shown. Further, although five possible selections are shown in FIG. 1, the particular number selected is not, in any way, limiting on the subject of the present invention and any number of selections less than or greater than five may be provided.

The preferred circuit of FIGS. 2 and 3 is an across-the-line type circuit diagram with the power line drawn vertically and the interconnecting lines drawn horizontally. Further, each of the horizontal lines is provided with a line number beginning with line L–1 and proceeding through line L–60 for purposes of referencing the description. Further, the relays of the circuit are given a sequenced number and the related contacts are identified by that number and a subnumber without showing the actual interconnection between the contacts. The description, however, specifically interrelates the relays and contacts by the across-the-line reference numbers.

Referring particularly to FIG. 2, the circuit can be generally divided into a plurality of branch circuits including an input and power drive circuit 16 including lines L–1 through L–10 inclusive, a player scoring section 17 including lines L–11 through L–16, inclusive, an answer selection and response circuit 18 including lines L–39 through L–47, inclusive, and an interlocking wrong answer selection circuit 19 including lines L–28 through L–38, inclusive. A continuation of the circuit of FIG. 2 is shown in FIG. 3 and includes a stepping switch and matrix control section including an input diode matrix circuit 20 including lines L–18 through L–27, and an output diode matrix circuit 21 including lines L–48 through L–60, inclusive.

Referring particularly to FIG. 2, the input and power drive section or circuit 16 generally includes a pair of alternating current input lines 23 which may be connected through a suitable plug unit or the like, not shown, to the conventional wall power supply. The connection preferably is of the usual three-wire system having a ground wire to provide the usual safety precautions. The film projector associated with film 3 is an alternating current driven unit employing a projecting lamp 24 in line L–1 and a paralleled film drive motor 25 in line L–2 and selectively connected directly to the power lines 23 through suitable control contacts as hereinafter described. In addition, the apparatus will normally be provided with suitable internal lamps for illuminating the front panel 1 or the like. As such devices are standard components, and may or may not be employed, they have not been shown for simplicity of illustration.

The control circuitry is generally otherwise powered from a low-voltage direct current power supply derived from the lines 23. A transformer 26 is shown having a primary 27 connected at line L–3 directly to the incoming power lines 23. The secondary 28 of the transformer 26 is connected at line L–4 to provide a reduced low voltage output to a full wave diode bridge rectifier 29, shown at line L–6. The output of the rectifier 29 provides a full wave, low-voltage direct current, for example, of the order of 14 volts. The output of rectifier 29 appears across a positive direct current control power line 30 and a related negative direct current line 31.

The input section 16 further includes a main start relay 32 in line L–7, one side of which is connected directly to the positive power line 30. The opposite side of the relay 32 is connected to the negative power line 31 in series with a blocking diode 33, a normally-open switch 34 of the coin receiver 6 and a set of normally-closed contacts 35–1 of a game start relay 35 at line L–16. Upon insertion of the proper coin, such as a quarter, the switch 34 will close thereby completing the circuit to energize the start relay 32. The relay 32 first closes a set of normally-open latching contacts 32–1 in line L–8. Contacts 32–1 directly bypass the coin switch 34 and the diode 33 to maintain the relay 32 energized until such time as the contacts 35–1 open.

A coin release solenoid 35a is connected in circuit directly through the normally-closed contacts 35–1 at line L–9 and is energized with the contacts 35–1 are closed. When the contacts 35–1 open, they will simultaneously reset the counter circuit and actuate the coin-release solenoid 35a removes the coin from the switch unit 34 and resets the input circuit. A coin counter, not shown, may be connected in parallel circuit with relay 32 to record the total receipt of money.

The relay 32 reset also actuates section 17 to the visual display score units 14 and 15 if they are not at zero, as follows. The scoring section 17 of the control circuit includes a first stepping coil 36 in line L–14 controlling the visual display 14 and a second similar stepping switch coil 37 at line L–15 controlling the visual display unit 15. Each of the score display drives is similarly constructed and connected into the circuit and consequently the stepping switch coil 36 and associated contacts and hardware are described in detail with the corresponding elements for the relay 37 identified by corresponding primed numbers.

The coil 36 includes a set of self-stepping normally closed contacts 36–1 connected in series with the coil 36 at line L–14. The stepping switch relay 36 is coupled to drive a pair of elongated contacts 38 and 39. The contacts, for example, may be an endless drum or band which is rotated through a suitable ratchet-type drive controlled by the energization and deenergization of the coil 36. The contact 38 includes a notch or offset portion 40 in one edge thereby defining a non-conductive portion. A first sliding contact 41 slidably engages the contact 38 adjacent the continuous uninterrupted edge portion and thus maintains continuous electrical contact for all positions of the contact 38. The sliding contact 41 is connected to the stepping switch contacts 36–1. A second sliding contact 42 is aligned with the opposite half of the contact 38 and thus in alignment with the portion of the contact 38 including the notch 40. In the home position, contact 42 is aligned with the notch 40 to thereby break the circuit between the contacts 41 and 42. Contact 42 is connected in series with a set of normally-open contacts 32–2 of the start relay to the negative power line 31 at line L–12. Thus, if the display unit 14 is not at the home or zero position, contact 42 will be in engagement with the conductive portion of the contact 38 thereby completing the circuit to the coil 36. Upon closure of the contacts 32–2, the coil 36 will be energized and through the opening of contacts 36–1 establish the usual self-stepping operation to continuously drive the conductive strip or contact 38 until such time as the stepping switch is returned to the zero or home position. To insure accurate stepping, a capacitor, not shown, may be connected in parallel with the stepping switch coils of the several units employed to maintain the coil energized and insure complete opening of the associated contacts 36–1 for a momentary period upon the initial opening thereof. At that position, of course, the contact moves into the notch 40 breaking the circuit to the stepping coil 36.

The relay stepping coil 37 is similarly connected at line L–15 to drive the associated contact 38' through a set of contacts 32–3 of relay 32.

The stepping switch for the unit 14 further includes the second conductive strip or contact 39 driven in synchronism with the contact 38. The contact 39 includes a pair of sliding contacts 43 and 44 interconnected to control the energization of the game relay 35. The relay 35 has one side connected directly to the positive line 30. The opposite side is connected to the contact 44. The contact 44 is connected to the contact 44' of the second player coil stepping unit. The contact 43', in turn, is connected to the negative supply line 31 through a set of contacts 32–4 of the start relay 32. The contact strips 39 and 39' are identically formed with an endless portion engaging the contacts 43 and 43', respectively. They, furthermore, include a slight lateral projection 45 at one stepping position which projection 45 is aligned with the contact or terminal 44. Thus, with the contacts 39 and 39' in one position relative to the contacts 44 and 44', the circuit to the relay 35 is completed upon the closure of the start contacts 32–4. This corresponds to the home position of the score display units 14 and 15.

Upon the depositing of the proper amount of money into the receiver 6, the start relay 32 at line L–7 is energized to lock itself into circuit through the game start relay 35. This circuit is maintained until the game relay 35 is energized. In turn, the game relay 35 can only be energized when both of the display units 14 and 15 have been zeroed or returned to the home position. When this occurs, the relay 35 is energized through the circuit just described, including the contact strips 39 and 39' and the start relay contacts 32–4 at line L–16. This results in the opening of the contacts 35–1 in line L–7 and the resetting of the start circuit.

The energization of the relay 35 simultaneously with the opening of the start relay circuitry closes a set of normally-open contacts 35–2 in a branch line 46 connected to the negative side of the relay 35. The line 46 extends to and is connected to the output matrix section 21 of the circuit as shown in FIG. 3 and, in particular, is connected in common to the cross lines L–52 and L–53 of FIG. 3 to provide for a controlled, continuous energization of the relay 35 during the programming and sequential operation of the control circuit for presentation of a complete program. Thus, the line 46 is connected to line L–53 of the output diode matrix and, in turn, is interconnected to a programming stepping switch unit 47 shown at lines L–26 and L–27 of FIG. 3 for cycling the sequential presentation of the several questions and the responses.

The stepping switch unit 47 is diagrammatically illustrated including a stepping coil 48 connected in circuit at line L–27 in series with a set of self-stepping contacts 48–1 and a manual control switch 49 for selectively connecting the stepping coil 48 to the DC line 30 and 31. The manual switch 49 is a single-pole multiple position switch unit having an off contact 50 to open and prevent operation of the stepping circuit, a manual step contact 51 which directly connects the coil 48 to the power lines and thus will maintain continuous recycling and stepping of the unit and an automatic contact 52 which selectively connects the stepping coil 48 into circuit through the input stepping switch matrix section 20.

The stepping switch unit 47 further includes a pair of elongated contacts 53 and 54 which may be endless bands, wafers or the like. Contacts 53 and 54 are associated respectively with the stepping input matrix section 20 and the output matrix section 21. Each of the contacts 53 and 54 is similarly constructed with a continuous portion and an offset portion at one position, numbered 55 and 56, respectively. The offset portions 55 and 56 are aligned with and selectively engage one of 12 contacts associated with the corresponding matrix. The 12 contacts are interconnected to 12 corresponding leads of the respective matrices. For purposes of explanation, the contacts or leads associated with the stepping input matrix section 20 are numbered 57 through 68, inclusive, and the corresponding leads of the output matrix section 21 are numbered 69 through 80, inclusive.

The stepping switch unit 47 may be the usual electromechanical-type unit having the relay coil 48 which, when energized, cocks a mechanical pawl-driving stepping system coupled to step the associated contacts 53 and 54 one position upon opening of the contacts 48–1 and de-energization of the associated coil 48. Thus, each step requires energization and de-energization of the stepping coil 48. The de-energization is automatically established through the normally-closed, series-connected contact 48–1 which, of course, open upon the energization of the coil.

The contact strip 53 is connected directly to the automatic contact 52 and thus interconnects the stepping coil 48 into the circuit through the input matrix. The contact strip 54 associated with the output matrix section 21 is connected directly to the negative power line 31 via the line L–26.

The stepping switch unit 47 is shown in the initial or home position with the contact 55 engaging the first contact line 57 of the input matrix section 20 and the contact 56 engaging the first contact line 69 of the output matrix section.

The line 57 is interconnected by a diode 81 to the cross line L–18 and in series with a set of normally-open contacts 35–3 of relay 35 to the power line 31. When the contacts 35–3 close, current flows through the stepping coil 48, the normally-closed contacts 48-1, the automatic contact 52 of the control switch 49, the contact strip 53, contact 55, line 57, diode 81 and the now closed contacts 35-3 to line 31.

In the initial starting position, a diode 82 interconnects the contact and associated line 69 of matrix 20 to the cross line L-53 which, in turn, is interconnected to the line 46 for providing power to the projector advance relay 35 at line L-16 in FIG. 2. In the initial starting position, the power is supplied to energize the relay 35 upon the energization of the start relay 32, as previously described. The relay 35 is then latched into circuit through the contacts 35-2 and the output diode matrix section 21. This latter circuit is furthermore maintained through each of the several stepping positions by corresponding diodes interconnecting the several other lines 71 through 79 to the line L-53 and, therefore, to line 46. The final step line 80 of the output matrix is connected, as hereinafter described, to terminate the cycle.

In stepping to the second position, the contact 55 engages the contact of line 58 of the stepping input matrix 20. This breaks the circuit to the cross reference line L-18 and terminates stepping of the coil 48. The coil 48, however, is now interconnected through the line 58, a diode 83, to the reference line L-19 which includes a set of normally-open contacts 84-1 of a projector advance relay 84 connected into the circuit at lines L-10 and L-11. The relay 84 is also connected into circuit via a branch line 84a to reference line L-48 of the output matrix section 21. The line L-48 is connected by a diode 85 to the second position line and contact 70 of the output matrix and thereby to the negative power line 31. Thus, when the output matrix is stepped to the second position, as previously described, power is now supplied to energize the projector advance relay 84.

The relay 84 closes a set of contacts 84-2 in line L-2 thereby connecting the projector motor to the AC power lines 23. The relay 84 further closes a set of contacts 84-3 in line L-11 to maintain itself through a wafer or strip contact and sliding contacts assembly 86 which provides direct connection between the contacts 84-3 and the relay 84. The contact assembly 86 includes a series of equispaced notched portions 87 breaking the connection. In the initial starting position, the projector advance motor 25 stops with the assembly 86 in alignment with a notch portion 87 and thus breaks the circuit to the projector advance relay 84. The relay 84 is initially energized through the output matrix section 21 via lines L-48 and diode 85 such that the motor 25 starts. Relay 84 is maintained through the assembly 86 to maintain motor operation until the next notch portion 84. This then breaks this particular holding circuit and de-energizes the relay 84. Contacts 84-2 open and the projector motor 25 stops to present the next frame.

As previously noted, the projector relay 84 also closes the contacts 84-1 in line L-19 and provides power through the diode 83 to actuate the stepping switch unit 47. This steps the input and the output matrix sections 20 and 21. The output matrix section 21 breaks the projector motor relay start at line L-48 and establishes the interconnection between the switch contact 56 and the output contact 54 with line 71 of the output matrix. In this position, power is supplied through the related diode 82 to maintain the game relay 35 energized. It, however, removes power from the line L-48 as there is no diode corresponding to diode 85 in the third position. Thus, the relay 84 is now only energized through the control contact assembly 86 and assures one full step.

The relay 84 includes a fourth set of contacts 84-4 in reference line L-20 to selectively provide power to a portion of the input matrix section 20. In particular, line L-20 is connected by a diode 88 to the third position line 59 and related contact of the input matrix. The contacts 84-4 are normally closed. Thus, when the relay 84 de-energizes after advancing of the projector film one step, the reclosing of the contacts 84-4 completes the stepping circuit through the line and contact 59 to again immediately step the main stepping coil unit 47, thus moving the circuit to the fourth matrix position in both sections 20 and 21. The fourth and fifth position lines 60 and 61, respectively, however, are connected by corresponding diodes 89 directly to the cross reference line L-25 which, in turn, is connected directly to the negative power line 31. Thus, the stepping switch unit 47 is directly stepped through positions 4 and 5 and to position 6, which is the position for presenting the first question. In the sixth position, a plurality of output circuits are established through the output matrix section 21.

In the sixth position, a diode 90 interconnects the cross reference line L-49 to the matrix contact line 74 and associated contact to provide a negative power connection via the contact portion of contacts 54-56 and cross reference line 26, at the reference line L-49. This line includes a projector lamp relay 91 in parallel with a question period timing relay 92. The paralleled relays 91 and 92 are connected to the positive power line 30 through a set of normally-closed contacts 84-5 of the projector advance relay 84. Thus, while the projector is advancing, the circuit to the lamp and the timing device are positively maintained open. When the projector is stopped, the circuit is conditioned to permit projection for a predetermined time period.

Thus, the projector lamp relay 91 closes a set of normally-open contacts 91-2 in cross line L-1 thereby completing the energizing circuit by connecting the projector lamp 24 directly across the alternating current input power line 23. As a result, the questions and answers on the film frame are projected and visually displayed to both players.

The relay 91 includes a further set of normally-open contacts 91-3 in the cross line L-17 which interconnects the negative line 31 in the two parts of the circuit and, particularly, provides a negative power to the continuation of line 31 connected to the circuit sections 18 and 19 in FIG. 2. This energizes the pushbutton units 8 and 9 as well as the interrelated answer selection control circuitry, relays and components. Referring particularly to FIG. 2, a pair of paralleled lamps 93 are connected to the power lines at cross line L-31 fo the first player and a pair of similar select answer lamps 94 are similarly connected at line L-38 for the second player to inform the players that they can select an answer. As previously noted, the answer selection circuit in FIG. 2 is shown only for a pair of selection rather than for the five possible selections for the purposes of simplicity in explanation. Normally, a separate lamp will be associated with each response and, consequently, a pair of lamps are shown in FIG. 2 for each player. The circuit for interconnecting and turning off the lamps is described hereinafter in connection with the sequence of a wrong or improper answer by either one of the players.

Referring particularly to answer selection section 18, the interconnection for two of the answer selection pushbutton units 10 for player 1 and a corresponding pair of pushbutton answer selection unit 11 for player 2 are shown interconnected into the circuit to provide an interrelated and conjoint control of the continued operation of the circuit and scoring thereof. As the present invention provides a paralleled controlled circuitry with suitable interconnection to common controls and controls of the other party, the switch unit 10 for the first player will be described in detail with the corresponding elements of the other player's elements identified by a corresponding but primed number and with the necessary description to show the interrelationship between the two sections.

The pushbutton units 10 are each multiple-pole and multiple-throw units, one bank of which is connected in section 18 and further banks of which are connected in section 19 as hereinafter described. One section of each switch unit 10 includes a common pole 95 biased into engagement with an interconnecting button contact 96 and selectively engaging a response contact 97 in response to actuation or depression of the unit by the player. The contact arm 95 of the first pushbutton unit 10 is connected to the input circuit of a switching transistor 98 which, in turn, is connected to control the response or energization of a correct answer relay 99 for the number one player. The contact 96 of the first switch unit is connected to the contact arm 95 of the second switch unit 10 and so forth to the final answer where the contact 96 is a dead contact. The alternate contact 97 of the switch unit 10 is interconnected to control an answer select transistor 100 the conductivity of which is controlled by a coded portion of the film strip 3, as presently described. This circuit is basically similar to that shown in applicant's copending application and thus is only briefly described herein. Thus, the transistor 100 has its input circuit interconnected to a power supply through a voltage-dividing network including a resistor 101 connected to a zero voltage line 102 connected to the center tap of the secondary transformer 26 at line L–4 in FIG. 2. A photocell unit 103 in series with a current-limiting resistor 104 and a diode 105 at line L–40 is connected to the negative line 31 via the projector lamp relay contacts 91–3. A lamp 106 is associated with the photocell 103. The film strip normally blanks the light from the unit 103 thereby maintaining minimal conduction. If the answer for a given question is properly the first switch unit 10, a small aperture will permit illumination of the corresponding photocell 103, thereby providing an input or turn-on bias signal to the base of the transistor 100. This then connects the relatively zero reference voltage to the associated contacts 97 and 97' of the switch units 10 and 11 for players 1 and 2. This provides a corresponding transfer of a turn-on signal to the associated transistor 98' at line L–45 as follows.

Once again, referring to the first player's circuit for purposes of description, a pair of series connected voltage-dividing resistors 107 interconnect the contact arm 95 to the diode 105 and thus to the negative line 31. The junction of the voltage-dividing resistors 107 is connected to the base of the transistor 98, the emitter of which is connected directly to the diode connecting line and thereby to the negative line 31 of the power supply. Thus, when the player moves the contact arm 95 into engagement with contact 97, the bias network or resistors 107 are connected directly between the negative line 31 and the relatively zero reference line 102 less any slight voltage drop associated with the collector-emitter circuit of the selection transistor 100. This results in driving of the base of transistor 98 positive relative to the emitter. The transistor 98 is shown as an NPN transistor and consequently will turn on. This, in turn, completes the circuit for the relay 99 as follows.

One side of the relay 99 is connected at line L–46 to the positive power line 30 through a set of normally-closed contacts 99'–1 of the second player correct answer relay 99' shown at line L–47. This insures that the second player has not first selected a correct answer and that, in fact, player one should still be given the opportunity to so select. The opposite side of the relay 99 is connected in series with a set of normally-closed contacts 108–1 of the first player incorrect or wrong answer relay 108 shown interconnected into the circuit at line L–28. As long as player one has not selected an incorrect answer, the contacts 108–1 will be closed and permit application of power to relay 99. The emitter-to-collector circuit of the transistor 98 at line L–45 is connected to the contacts 108–1 and to the power line 31 via the diode 105 at line L–40. Thus, when the transistor 98 is biased on as previously described, a complete energizing circuit is established for the relay 99 and the relay is energized. The relay 99 actuates a set of contacts 99–1 at line L–47 to break the circuit to the second player's correct response relay 99' and prevent energization thereof.

The relay 99 further immediately closes a set of latching contacts 99–2 at line L–46 which directly latches the relay 99 to the negative line 31 via the contacts 91–3. Thus, the correct player relay 99, once energized via the transistor 98, is latched into the energized position independent of such transistor as long as the projector lamp relay 91 at line L–49 is energized.

The relay 99 controls a third set of contacts 99–3 in cross line L–28. The contacts 99–3 are normally closed and provide power into the wrong answer control section for the player one. Thus, if a proper answer is selected, the wrong answer selection section is opened to prevent energization of this portion of the circuit.

The relay 99 controls a fourth set of contacts 99–4 connected in the cross line L–50 of FIG. 3. The line L–50 is connected by a lead 109 to the one side of the first player-related score stepping coil 36 in line L–14 of the scoring section 17 for actuating the visual display unit 14 for the first player upon closure of contacts 99–4. Thus, the cross reference line L–50 is connected by a diode 110 to the sixth position line of the output matrix and thus, in the sixth position of the stepping switch unit 47 interconnects the contacts 99–4 through the contact 54 to the cross line L–26 and thus to the negative side of the power supply. Thus, upon closure of the normally-open contacts 99–4, an energizing circuit is established for the coil 36 at line L–14. The energization of the coil 36 results in a conditioning of the interconnecting mechanism to step the contacts 38 and 39 one step. This cannot occur, however, until the coil 36 is de-energized.

De-energization results through the actuation of the main program stepping switch unit 47 and, in particular, through a fifth set of normally-open contacts 99–5 of relay 99 which interconnect the input matrix section 20 at line L-22 to the negative power line 31. A diode 111 interconnects the line L-22 to the sixth position line 62 of the input matrix and thus through the contact 52 interconnects negative power to the one side of the stepping coil 48. When the correct answer relay contacts 99-5 close, the program stepping switch unit 47 steps to the seventh position. In the seventh position, the output matrix line L-50 is disconnected from the associated seventh position line 75. This breaks the circuit via line 109 to the player score relay 36 which is then de-energized and adds to the score of the first player on the visual display unit 14.

In the seventh position of the output matrix, a diode 112 interconnects the seventh position line 75 to the cross line L-58 to provide power to one side of a correct answer bell 113 or the like. The opposite side of the bell 113 is connected in the circuit through a set of normally-open contacts 99-6 of the correct answer relay 99. The relay 99 is still energized during this stepping motion as a result of the latching contacts 99-2 at line L-46.

The seventh position of the input matrix provides automatic stepping to the eighth position. Thus, a diode 114 interconnects the seventh position line 63 directly to the cross line L-25 and thus completes a circuit with the contact 53 in the seventh position to energize the stepping relay coil 48 to step to the eighth position.

In the eighth position of the input matrix, a further direct stepping to position 9 is established through a diode 115 which interconnects the eighth position line 64 to the cross line L-22. The relay 99 is still energized and, consequently, contacts 99-5 in line L-22 are closed. This thus provides subsequent energization of the coil 48 and stepping of the stepping switch 47 to the ninth position.

In the eighth position, the first players's scoring relay coil 36 is again energized through the output matrix. Thus, a diode 116 interconnects the eighth position line 76 to the cross line 50 and thereby provides energization to line 109 via the now-closed contacts 99-4. Thus, the coil 36 is energized in position 8 and again de-energized in the ninth position whereby the score stepper adds a further score to the visual display unit 14 of the first player.

In the ninth position, a diode 117 interconnects the ninth position line 77 to the cross line L-58 to again energize the correct answer bell 113.

In the ninth position of the input stepping matrix, a diode 118 connects the ninth position matrix line and contact 65 directly to the cross line L-25 to provide for a further stepping of the stepping switch unit 47 and thereby establishing the tenth position. This, of course, de-energizes the correct answer bell 113 in line L-58 as the tenth position line 78 of the output matrix is not interconnected to the line L-58.

The unit 47 automatically steps to the eleventh position as a result of a diode 119 interconnecting line L-22 to the tenth position line 66 of the stepping relay input matrix. In this position, relay contact 99-5 are still closed and, consequently, provides for the automatic stepping to position 11. This records the maximum score for the player 1 with respect to the first answer.

In the 11th position of the stepping switch unit 47, the output matrix section 21 provides for suitable signaling of the correct answer to both players by illuminating of the correct answer button units 10 and 11 and simultaneously thereby indicating that the next question is about to be presented, as follows. A diode 120 of the output matrix interconnects the vertical matrix line and contact 79 to the cross line L-59 which is interconnected via a lead 121 to the answer selection circuitry at cross line L-42. A pair of correct answer lights 122 are connected in series between line 121 and the output circuit of the transistor 100 with an isolating diode 123 therebetween.

Simultaneously, a pair of "go" lights 124 at cross line L-60 are energized. The line L-60 is connected by a diode 125 to the eleventh position matrix line and contact 79 of the output matrix section 20 such that in the eleventh position, the "go" lights 124 are directly energized. This indicates to the players that the "go" button unit 12 should be actuated to provide for the presentation of the next question.

A diode 126 interconnects the eleventh position line 67 of the input matrix section 20 to the cross line L-23 which, in turn, includes the "go" pushbutton switch 127 of unit 12.

Actuation or closure of switch 127 thus actuates the stepping switch unit 47 to the twelfth position from which it automatically returns to the initial starting position through the connection of a diode 128 at line L-25. Diode 128 directly connects the twelfth position line 68 of the input matrix to the line L-25 and provides for automatic stepping to the first position.

Referring to the output matrix section 21, stepping to the first position results in opening of the circuit at line L-49 thereby resetting the projector lamp relay 91 and the timing relay 92.

The de-energization of the projector lamp relay 91 not only results in the opening of the circuit to the projector lamp 24 at line L-1 but also opens the contacts 91-3 at line L-17, thereby removing power from and resetting the correct answer circuit 18 of the apparatus and, in particular, breaking of the latching circuit through the contacts 99-2 and relay 99 at line L-46.

The apparatus is now in a condition to recycle, providing a corresponding sequence for the second question.

If the second player had been the first to push the related correct answer pushbutton unit 11, a similar sequence to that just described would have been created through the energization of the switching transistor 98' at line L-45 and the energization of a corresponding relay 99' at line L-47. The relay 99' open the contacts 99'-1 to de-energize the first player's relay 99 and simultaneously close related contacts 99'-2 at line L-47 to latch the relay 99' into circuit. Contacts 99'-3 at line L-33 open to de-energize the second player's incorrect answer's circuitry. Contacts 99'-4 at line L-51 close and interconnect the cross line L-41 into the output diode matrix in the same manner as line L-50. Line L-51, in turn, is connected via the lead 129 to actuate the second player's score coil 37 at line L-15 in the same manner as the coil 36 of the first player was energized through the closure of contacts 99-4 at line L-50, and, in particular, through the matrixing diodes 110' and 116' which interconnect cross line L-51 to the matrix lines 74 and 76 respectively. The corresponding stepping action is established by contacts 99'-5 which are connected at line L-22 in parallel with the first player's relay contacts 99-5. The correct answer bell 113 at line L-58 is correspondingly energized through a set of contacts 99'–6 which are connected in parallel with the first player's contacts 99–6.

If either player should select a wrong answer, the wrong answer section 19 of the circuit is energized. Further, the energization is in such a manner that the player selecting the wrong answer cannot obtain a further selection until such time as the other player has made a selection. If both players, in sequence, select the wrong answer, the score is automatically reduced after which both players have another turn to obtain the lower score in a corresponding sequential interlock. If neither should score, however, within that time, a zero display is established followed by elimination of the correct answer recycling to the next question. This sequence is described as follows by reference to FIG. 2 and particularly the first player's circuitry with the corresponding elements of the second player's circuitry being identified by corresponding primed numbers.

As previously noted, each of the switch units 10 is a multiple-poled switch unit. In addition to the contact arm 95 at line L–43, each switch unit 10 includes a plurality of other contact arms shown connected in section 19. In particular, in the illustrated embodiment of the invention, each switch unit includes three contact arms or poles forming single pole, double-throw switches 130, 131 and 132, which are ganged to each other and to the common pole 95 for simultaneous actuation therewith. The switches 130, 131 and 132 are normally-open switches, one side of which is connected in common at line L–28 to the normally-closed correct answer relay contacts 99–3.

The switch 130 interconnects the wrong answer relay 108 to the power lines through the normally-closed relay contacts 99–3 and the now-closed contacts 91–3 of the projector lamp relay 91. Thus, the matrix drive stepping switch unit 47 always move through the first five positions and to position 6 as previously described. Energization of the relay 108 opens the contacts 108–1 at line L–46 to prevent the first player from operating the correct relay 99. Energization of relay 108 also results in closing of a set of normally-open contacts 108–2 at line L–31. One side of these contacts 108–2 is connected directly to the relay side of the switch 130. The opposite side of the contacts 108–2 is connected to the wrong answer circuitry of lamps 93 and, in particular, to a lead 133 which is connected directly to the power line through the normally-closed contacts 99–3. Thus, when the relay contacts 108–2 close, they provide a latching circuit to hold the relay 108 energized until such time as the projector lamp relay contacts 91–3 open. As hereinafter noted, this can only occur if the second player selects an answer or the timing circuit operates to recycle to the next question. The relay 108 controls a third set of normally-closed contacts 108–3 at line L–31. The contacts 108–3 connect the line 133 to the player select lamps 93. When the relay 108 is energized, contacts 108–3 open, thereby de-energizing of the player select answer lamps 93 and indicating that he cannot, at this time, actuate any of his pushbutton units 10 with any result.

The second ganged switch 131 at line L–29 connects a wrong answer lamp 134 into circuit in parallel with the actuation of the relay 108. The wrong answer lamp 134, however, is energized only as long as the player holds the associated pushbutton unit 10 depressed and goes out as soon as the player releases the pushbutton unit 10.

The third switch 132 interconnects an inhibit step relay 135 at line L–32 into circuit through a diode 136. The relay 135 is thus energized when the player depresses the erroneous pushbutton switch unit 10 as a result of the contact 99–3 remaining closed. The inhibit step relay 135 and the player related wrong answer relay 108 are interconnected to control the sequencing and recording of the circuit operation during the movement or stepping of the switch unit 47 through the position six through twelve and to control energization of a wrong answer alarm such as a buzzer 137 at line L–5. The relay 108 includes an open set of contacts 108–4 in series with a set of normally-open contacts 135–1 of the inhibit step relay 135 and the buzzer 137 connected across the output of the transformer secondary 28. The contacts 108–4 will be latched in through the latching of the wrong answer relay 108, the inhibit step relay 135 is energized as long as the player one depresses his pushbutton to establish a wrong answer signal.

In addition, the energization of the relays 108 and 135 condition a both players' wrong answer circuit at line L–54 of FIG. 3 and particularly a both-player wrong answer relay 138. One side of relay 138 is connected directly to the positive power line 30 and the opposite side is connected in series with a set of normally-closed contacts 135–2 of relay 135, a set of normally-open contacts 108–5 of the first player wrong answer relay and a set of contacts 108'–5 of the second player wrong answer relay 108' into the output matrix network. The sixth position line 74 and the eighth through the twelfth position lines 76 through 80 inclusive are similarly connected by corresponding individual diodes 139 to the reference or cross line L–54. This conditions the circuit of relay 138 for operation in either the sixth or the eighth to the twelfth position if both players have selected an improper or wrong answer but only if such has occurred. Further, the players must have released the associated button units 10 and 11 before the relay 138 can be energized. Thus the relay contacts 135–2 are controlled by the inhibit relay 135 which, in turn, is connected into the circuit in common through the third switches 132 and 132' of the switch button units 10 and 11. The first player to select the wrong answer thus locks out the energization of the relay 138. This does not, in any way, affect the opportunity of the other player to select a correct answer. Consequently, there is no reason for the first player to hold the improper answer pushbutton unit 10 depressed. The second player can then determine the correct answer. If he answers correctly, the circuit functions exactly as previously described through the operation of the relay 99'.

If the second player also selects incorrectly, he will energize his relay 108' at line L–33 through the switch 130' to energize the related second player wrong answer lamp 134' through the switch 131' to energize the inhibit step relay 135 through the diode 136' and switch 132'. Energization of the second player wrong answer relay 108' results in latching of the relay 108' in a circuit through the normally-open contacts 108'–2, energizing of buzzer 137 by closure of contacts 108'–4 at line L–5, and the de-energization of the second player select answer lamps 94 through the now-opened, normally closed relay contacts 108'–3. The relay 108' latches in and also closes contacts 108'–5 at line L–54. The wrong answer or inhibit step relay 135 is de-energized upon release of the wrong answer pushbutton unit 11 and the contacts 135-1 at line L-5 open to de-energize buzzer 137 and contacts 135-2 at line L-54 return to the normally-closed position thereby completing the circuit to the relay 138. The diode 139 in the sixth position interconnects the line L-54 to the sixth position matrix line and contact 74. Once the relay 138 is energized, it is maintained energized through a set of normally-open latching contacts 138-1 which are connected in parallel with the several wrong answer relay contacts at line L-54. Relay 138 includes a second set of stepping contacts 138-2 connected in line L-24 providing power into the input matrix section 20. The contacts 138-2 are normally-open contacts and a diode 140 connects the line L-24 to the sixth position matrix line and contact 62 of the first section contact 53. In the sixth position, the energizing of relay 138 results in stepping of the switch unit 47 to the seventh position.

The stepping opens the circuit to both player wrong answer relay 138 as a result of the absence of the diode 139 between the seventh position line 75 of the output matrix and the cross line L-54. As a result, the both player wrong answer relay 138 is reset.

The both player wrong answer relay 138 also controls a set of contacts 138-3 at line L-32 which forms a common input connection between the positive power line 30 and the connection to the wrong answer section 19 of the circuit. Thus, when the relay 138 is energized, the circuits of relays 108 and 108' are de-energized and the corresponding latching contacts open. This resets the both player wrong relay 138 and the answer section 19 and in particular relays 108, 108' and 135 to re-establish the control circuit similar to that obtained by a correct answer by either party but with the circuit for the input matrices now at the eighth position line. Thus, in the seventh position, the input matrix provides an automatic stepping similar to that described when a correct answer is established through the interconnection of the diode 114 between the line L-25 and the seventh position matrix line and contacts 63 of the first contact 53. The player select lamps 93 and 94, respectively, are again on and indicate that the players can now try again at the reduced score level.

A correct answer by either player at this time would initiate the same sequence previously described for a correct answer providing for recording of the reduced score as a result of a single actuation of the player score coils 36 or 37 depending upon which player selected the proper answer. Wrong answers would reinitiate the same sequence just described immediately above with the energization of the relay 138 at line L-54.

At position eight of the input matrix section 20, a diode 141 connects the eight position matrix line and contact 64 to the cross line L-24 and thus interconnects the stepping circuitry through both player wrong relay contacts 138-2. This will result in stepping to the ninth position. It should be noted that in the eighth through the twelfth positions, the output matrix section 21 includes diodes 139 interconnecting the reference line L-54 to the respective lines 76 through 80. The second energization of relay 138 is maintained energized and the contacts 138-2 at line L-24 are maintained closed. Thus, the diode 141 at position eight provides for stepping of the unit 47 to move the switching unit to the position nine. At position nine, the diode 118 connected between the cross line L-25 and the ninth position line 65 provides for automatic stepping to the tenth position. At that position, a diode 142 interconnects the cross line L-24 to the tenth position line 66 thereby providing for stepping to position eleven through the normally-closed contacts 38-2. In position 11, the correct answer line 121 is energized through the output matrix and particularly through the diode 120 which interconnects the cross line L-59 to the eleventh position line 79. Line 121 illuminates the appropriate lamps 122 of section 18 is previously described.

As in the previous description, the "go" lights 124 at line L-60 are also energized through the diode 125. The question is then presented with the correct answer and held awaiting actuation of the "go" switch 127 at line L-23 or automatic stepping by operation of timer 92.

As previously noted, timer 92 is connected in parallel with the projector lamp relay 91 at line L-49. A set of timer contacts 92-1 at line L-21 are normally open and time-out after a predetermined time energization of relay 92. The sixth, eighth, tenth and eleventh position lines and contacts 62, 64, 66 and 67 of the input matrix section 20 are connected by individual diodes 143 to line L-21 such that if the game is in any one of such positions after a predetermined time period, the closure of contacts 92-1 will provide for automatic stepping to the next position including the twelfth position at which the stepping switch unit 47 is automatically recycled to the home or initial position through the interconnection of the diode 128 at line L-25. Furthermore, the seventh and ninth positions which are not interconnected through the time-delay switch include direct stepping switch diodes 114 and 118 which respectively connect the cross line L-25 to the seventh and ninth position lines of the input matrix. Thus, after the timing out of relay 92 the circuit is established to directly and continuously step the stepping switch unit 47 to the initial position independently of the selection of the balance of the circuitry.

Thus, if the players do not complete all of their attempts at answering the question within a preset time delay, the circuit automatically recycles giving the correct answer and presenting the next question. The previous question is, therefore, lost and the game proceeds with the next question.

This, and all subsequent questions which may be included within any given catgeory, is correspondingly presented and responded to by the players.

As noted, with an incorrect response or even with a correct response after a first incorrect response, the allotted score may decrease and if not answered within an allotted time will reduce to zero. This may be visually indicated by a plurality of score-related lamps such as shown at lines L-55, L-56 and L-57. Thus, line L-56 includes a maximum score lamp 144 which is interconnected to the sixth position output line of the output matrix via a diode 145. In the sixth position, this lamp is illuminated and will be maintained illuminated until such time as the stepping unit 47 is actuated to move to the seventh and then to the eighth position which is automatically sequenced as previously described. In the eighth position, a reduced score lamp 146 at line L-56 is interconnected into the circuit via a diode 147 which interconnects the cross line L-56 to the matrix output line 76. Thus, if the correct answer is given only after a first wrong selection, the reduced score as indicated by the lamp 146 will be recorded. If the response is not established until the device has been stepped to the eleventh position as a result of a second dual incorrect response, a lamp 148 at line L–57 is turned on as a result of an interconnecting diode 149 which connects the eleventh position line 79 of the output matrix to the line L–57.

All of the questions in the category are presented in a time spaced sequence with the circuit similarly responding to the various combinations of inputs by the two players.

When the final question in the series is presented, a final question relay 150 at line L–39 of FIG. 2 is energized as follows. A final or game termination relay transistor 151 at line L–41 is provided with an input circuit in parallel with the input circuits to the answer selection transistors 100. The final question film frame will have an appropriate aperture or light transmitting opening transmitting light to a photocell 152, thereby turning on transistor 151. The emitter-to-collector or output circuit of the transistor 151 is connected in circuit with the input circuit of a transistor 153 at line L–40 and the diode 105 directly across the lines 30 and 31. Thus, when the transistor 151 is biased to conduct, it, in turn, biases the NPN transistor 153 to conduct. The output of the transistor 153 is connected between the diode 105 and the negative power side of the relay 150. The opposite side of the relay 150 is connected directly to the positive line 30 and, therefore, conduction of the transistor 153 provides a turn-on current through the relay 150. The relay 150 includes a set of holding or latching contacts 150–1 connected in parallel with the final question transistor 153 and the diode 105. Thus, when the relay 150 is energized, contacts 151 close and hold the relay 150 energized until such time as the projector lamp relay 91 is deenergized to open the contacts 91–3 to remove power from the circuit 18 and relay 150.

A final question lamp 154 is connected in parallel with the relay 150 and is correspondingly energized to indicate to the players that the final question is being presented.

The relay 150 controls a second set of contacts 150–2 in line L–52 of the output matrix section 21 in FIG. 3. The contacts 150–2 are normally-closed and are connected to the game relay 35 through the interconnecting lead 46 and the self-latching contacts 35–2 of relay 35. The relay contacts 150–2 are connected to the twelfth position line and contact 80 by a diode 155. Thus, contacts 150–2 are closed except for the very last question and the line 46 is maintained energized at the twelfth position via the diode 155 for all of the previous questions. When the final question has been presented, however, the contacts 150–2 are held open. When the stepping switch unit 47 now reaches the twelfth position, the circuit to the game relay line 46 is broken by the contacts 150–2. The power path to relay 35 at line L–16 is open and relay 35 is de-energized. When the stepping switch unit 47 now reaches its first position, contacts 35–3 at line L–18 are open. The stepping switch unit 47 is therefore incapable of directly recycling as in the previous questions. The circuit is now in the standby condition requiring insertion of another coin into the receiver 6 to again close the switch 34.

The overall sequence of the system can thus be briefly summarized as follows. The game is started by insertion of a coin into the receiver 6 to initiate the energization of the starting relay 32 which automatically resets the visual display units 14 and 15 to zero and then energizes the game relay 35 which is latched into the circuit through the diodes 82 at line L–53 and the diode 55 at line L–52, to maintain the relay 35 until all of the questions have been presented. The stepping switch unit 47 then automatically steps through the first five positions to actuate the projector motor 25 to present the proper question and establish the sixth position for responding to an appropriate or inappropriate answer or answers and to establish the projection of the first question and associated answers. The stepping unit 47 is then sequenced through the positions 6 through 12 in response to the selection of improper or proper answers by the respective players actuating the pushbutton units 10 and 11. If a player selects a correct answer on his first selection, he obtains a maximum score. If a player selects an incorrect answer on his first selection, his circuit is locked out until such time as the second player makes a selection. If he makes proper selection, he obtains the maximum score. If he selects an improper answer, the stepping unit 47 steps to a reduced score position where both players may then make sequential selections of an improper or proper answer, being rewarded with a reduced score in response to a proper answer. Improper answers automatically reduce the score to zero and recycles to the next question. If both players fail to respond within a given allotted time, the timing relay 92 at line L–49 automatically cycles to the next question thereby preventing either player from scoring based on the previous question.

The stepping switch unit 47 thus recycles after the time delay of relay 92 or in response to actuation of the "go" button 127 at line L–23 after reaching of the eleventh position with the same sequence being followed for each of the questions except for the final question.

The final question results in the energization of the relay 150 through the illumination of the photocell 152. This sets up the circuit and, in particular, opens the circuit to the game relay line 46 at line L–52 such that when the twelfth position is reached, the latching circuit to the game relay 35 is opened. The game circuit is reset with the game relay contacts 35–3 at line L–18 open and preventing the self-stepping of the stepping switch unit 47 to the second position.

This, then, requires reinsertion of a further coin in the receiver 6 to recycle and initiate a new game.

The present invention has been found to provide a reliable and versatile multiple-player information device for multiple-choice instructional apparatus and the like.

Various modes of carrying out the invention are contemplated as being within the scope of the following claims which particularly point out and distinctly claim the subject matter which is regarded as the invention.

I claim:

1. An instructional apparatus for simultaneous operation by a plurality of different persons, comprising presentation means for sequentially presenting stimulus information, a plurality of groups of response means, a plurality of separate multiple input selection means for actuating a corresponding response means, each of said multiple input selection means being particularly related to said information whereby selected actuation of a predetermined one of the input selection means of each group is proper and creates a first response and actuation of other of the same input selection means of each group is improper and creates a second response, interlock means responsive to actuation of any one separate input selection means selectively controlling the response means to determine the subsequent establishment of said first and second responses, said information includes visual display of a question and a plurality of proposed answers including only one of which is correct, each of said response means including correct response control means and an incorrect response control means connected to define said interlock means, each of said selection means including a corresponding number of answer-related switch means individually connected to actuate the corresponding incorrect and correct response control means, said correct response control means including means coupled to operatively disable the correct response control means of the other response means and to said corresponding incorrect response control means, said incorrect response control means including means coupled to disable the corresponding correct response control means and to latch the activated incorrect response control means in a response state, and reset means responsive to the predetermined actuation of said correct response means and said incorrect response means to selectively reset the several control means.

2. The instructional apparatus of claim 1, wherein each group of response means includes an individual incorrect response indicating means, and having a common incorrect response indicating means.

3. The instructional apparatus of claim 1, wherein said reset means includes cycling means coupled to reset the incorrect response control means and permit a subsequent actuation of the multiple input selection means.

4. An instructional apparatus for simultaneous operation by a plurality of different persons, comprising presentation means for sequentially presenting stimulus information, a plurality of groups of response means, a plurality of separate multiple input selection means for actuating a corresponding response means, each of said multiple input selection means being particularly related to said information whereby selected actuation of a predetermined one of the input selection means of each group is proper and creates a first response and actuation of other of the same input selection means of each group is improper and creates a second response, interlock means responsive to actuation of any one separate input selection means selectively controlling the response means to determine the subsequent establishment of said first and second responses, said information includes visual display of a question and a plurality of proposed answers including only one of which is correct, each of said response means including correct response control means and an incorrect response control means, each of said selection means including a corresponding number of answer-related means individually connected to actuate the corresponding incorrect and correct response control means, said incorrect response control means including means coupled to disable the corresponding correct response control means and to latch the activated incorrect response control means in a response state, and reset means responsive to actuation of said plurality of incorrect response control means to reset the incorrect response control means.

5. The instructional apparatus of claim 8, wherein each of said control means in corresponding response relay connected to define said interlock means, said answer-related means being switches, code means associated with the presentation means individually connecting the switches to energize the corresponding incorrect and correct response relays, each of said correct response relays including disable contacts in the circuit of the correct response relays of the other response means and in the circuit of corresponding incorrect response relays, said incorrect response relays including disable contacts in the circuit of the corresponding correct response relay, each of said relays having latching contacts in latching circuits to maintain the corresponding relay energized, and said reset means selectively opening the latching circuits to said relays.

6. The instructional apparatus of claim 4, wherein said presentation means includes a multiple frame film and film projection means for sequentially presenting in time-spaced relation a series of film frames each of which includes a question and a plurality of responsive answers only one of which is correct, said film carrying coded means to indicate said correct answer, a code reader selectively coupled to said film to read the correct answer coded means for the question being presented and establish a related output signal, each of said input selection means including a first group of individual answer selection switch means connected to said code reader with the corresponding switch means of said plurality of selection means being connected in common to said code reader, each of said correct response control means including a correct answer switch means connected to the corresponding selection switch means for selective energization in accordance with the output signal of said code reader, said input selection means including a second group of individual selection switch means coupled to said corresponding first group, each of said incorrect response control means including an incorrect answer switch means connected to the corresponding individual selection switch means of said second group, each of said correct answer switch means having latching means connected to hold itself in operation and first disable means connected to disable all other correct answer switch means and second disable means to disable the corresponding incorrect answer switch means, each of said incorrect answer switch means having latching means connected to hold itself in operation and disable means connected to disable the corresponding correct answer switch means, cycle means responsive to operation of a plurality of the incorrect answer switch means to reset said latching means and re-enable said correct answer switch means and said disable means, and said reset means responsive to actuation of a correct answer switch means and to a second actuation of the plurality of incorrect answer switch means to actuate said presentation means.

7. The instructional apparatus of claim 4, wherein said information includes visual display of the stimulus information and a plurality of proposed responses including correct and incorrect responses, each of said response means including a correct response control switch means and an incorrect response control switch means, a multiple incorrect response switch means, each of said selection means including a corresponding number of proposed response-related switch means each having a first switch individually connected to actuate the corresponding correct response control switch means and a second switch individually connected to actuate said corresponding incorrect response control switch means and a third switch connected to actuate said multiple incorrect response switch means, said correct response control switch means including a first switch coupled to operatively disable the correct response control switch means of the other response means and a second switch connected to operatively disable said corresponding incorrect response control switch means, said incorrect response control switch means including a third switch coupled to disable the corresponding correct response control switch means and a fourth switch to latch the activated response control switch means in a response state, means connecting said multiple incorrect response switch means to reset said several control switch means, and reset switch means to selectively reset the several control switch means.

8. The instructional apparatus of claim 7 wherein said reset means includes a cycling switch means having a plurality of contact positions including first contact positions energizing said presentation means, second contact positions energizing said response control means and said multiple input selection means, a third contact position energizing said reset switch means, a fourth contact position energizing said response control means input selection means, and a timing means connected to operatively reset the apparatus to present a further bit of information and related responses after a predetermined period of the presentation of a given bit of information, said cycling switch means energizing said timing means in said second through said fourth contact positions.

9. The instructional apparatus of claim 4, wherein said presentation means includes a film and film projection means for sequentially presenting a series of questions in time-spaced relation, said film simultaneously presenting a plurality of responsive answers including one of which is correct, correct coded means to indicate the correct answer, a code reader reading the coded means for the question being presented, said input selection means including a first group of individual selection switch means connected to said code reader to establish a power supply connection means with the corresponding switch means in said plurality of response means being connected in common to said code reader, each of said correct response control means including a correct answer means connected to the corresponding selection switch means, said input selection means including a second group of individual selection switch means coupled to said corresponding first group, each of said incorrect response control means including an incorrect answer means connected to the corresponding individual selection switch means of said second group, each of said correct answer means having latching means connected to hold itself in operation and first disable means connected to disable all other correct answer switch means and second disable means to disable the corresponding incorrect answer switch means, each of said incorrect answer means having latching means connected to hold itself in operation and disable means connected to disable the corresponding correct answer switch means, and said reset means being responsive to selected actuation of said correct answer switch means or said incorrect answer switch means to actuate said presentation means to present a new question.

10. The instructional apparatus of claim 9, wherein said film carrying said coded means to indicate a correct response, a multiple channel code reader having a channel for each given response and selectively coupled to said film to establish an output circuit for the correct response coded means, said first group of individual selection switches connected in series with each other and having an actuated position connected to said code reader with the corresponding switches in said plurality of response means being connected to the related output channels of said code reader, each of said response means including a correct answer relay connected to the corresponding series connected selection switches, said each of said response means including an incorrect answer relay connected to the corresponding individual selection switch means of said second group, each of said correct answer relays having latching contacts connected to hold the corresponding relay in operation and first disable contacts connected to open the circuit to all other correct answer relays and second disable contacts to disable the corresponding incorrect answer relay, each of said incorrect answer relays having latching contacts connected to hold the corresponding relay in operation and disable contacts connected to open the circuit to the corresponding correct answer relay, cycling switch means to sequentially energize the presentation means and the code reader, second try relay means actuated by a plurality of said incorrect answer relays and said cycle means to reset said incorrect answer relays and said correct answer relays, and said reset means being responsive to actuation of correct answer relay and to a second actuation of said second try relay means to actuate said presentation means.

11. The instructional apparatus of claim 10, having presentation drive means, said cycling switch means having a plurality of first lines and a plurality of second lines, a stepping switch means coupled to said first lines for sequentially and cyclically supplying power to said first lines, means connecting selected said second lines to said presentation drive means, said code reader and said relays, said stepping switch means being sequentially connected to selected first lines, and unidirectional conductor means selectively connecting the first lines to said second lines to establish a predetermined transfer of power from said first lines to said second lines during the presentation of each stimulus information and related response information.

12. The instructional apparatus of claim 10, wherein said presentation means includes a triggered self cycling drive means for said film projection means coded means to indicate a correct response and to establish an output circuit for the correct response coded means, said first group of individual selection switches connected in series with each other and having an actuated position connected to said code reader with the corresponding switches in said plurality of response means being correspondingly connected to said code reader, each of said response means including a correct answer relay and a transistor switch connected to the corresponding series connected selection switches to energize said relay, each of said response means including an incorrect answer relay connected in series to the corresponding individual selection switch means of said second group, each of said correct answer relays having latching contacts connected to hold the corresponding relay in operation and first disable contacts connected to open the circuit to all other correct answer relays and second disable contacts to disable the corresponding incorrect answer relay, each of said incorrect answer relays having latching contacts connected to hold the corresponding relay in operation and disable contacts connected to open the circuit to have corresponding correct answer relay, a scoring means having a cyclical drive means establishing a selected score for each cycle, cycling switch means to sequentially energize first the drive means of said presentation means and then film projection means and the code reader with the response means and the input selection means, second try relay means actuated by a plurality of aid incorrect answer relays and said cycle means to reset said incorrect answer relays and said correct answer relays, and said reset means being responsive to actuation of correct answer relay and to a second actuation of said second try relay means to actuate said presentation means.

13. The instructional apparatus of claim 9, wherein said film carrying coded means to indicate a correct response, a multiple channel code reader having a channel for each given response and selectively coupled to said film to establish an output circuit for the correct response coded means, said first group of individual selection switches connected in series with each other and having an actuated position connected to said code reader with the corresponding switches in said plurality of response means being connected to the related output channels of said code reader, each of said response means including a correct answer relay connected to the corresponding series connected selection switches, each of said response means including an incorrect answer relay connected to the corresspoinding individual selection switch means of said second group, each of said correct answer relays having latching contacts connected to hold the corresponding relay in operation and first disable contacts connected to open the circuit to all other correct answer relays and second disable contacts to disable the corresponding incorrect answer relay, each of said incorrect answer relays having latching contacts connected to hold the corresponding relay in operation and disable contacts connected to open the circuit to the corresponding correct answer relay, and cycle switching means to sequentially energize the presentation means and the code reader.

14. The instructional apparatus of claim 13, wherein said cycle switching means includes a first switching matrix including a plurality of first lines and a plurality of second lines interconnected by diodes and a second switching matrix including a plurality of third lines and a plurality of fourth lines interconnected by diodes, a first power contact member mounted to sequentially and cyclically scan said first lines to supply power thereto, a second power contact member mounted to sequentially and cyclically scan said third lines from a home third line to a reset third line, a step drive means coupled to said contact members and connected to said second contact member, a cycle start means having contacts connected to a fourth line connected to the home position third line, said second lines being connected to said cycle relay and to selected first lines to establish a start means maintaining circuit, one of said pair of said second lines including stop presentation contacts and being connected to a final reset first line to reset the apparatus to standby, a projection advance relay, a second position of said second matrix connected to supply power to said projection advance relay, the second and third positions of said first matrix connected to supply power to said switch drive means through projecting advance relay contacts in said fourth lines, a projection relay connected to a second line connected to first lines in all switch positions following said third position, said projection relay having contacts connected in circuit with said code reader and said input selection switches and said response means, a correct response means, each of said correct answer relays having contacts in a corresponding second line and operable to actuate the correct response means with said first matrix in a selected position following the third position, each of said correct answer relays having contacts connected in parallel with the corresponding contacts of the other correct answer relay in a fourth line connected to third lines in the position of the second matrix corresponding to the selected position of said first matrix, a both player wrong means said incorrect answer relays having contacts connected in series with each other with the both player wrong means in a second line of said first matrix connected to first lines in all positions following said selected position said both player wrong means having contacts connected in a fourth line of said second matrix to reset said cycle switching means to the home position in response to energization of the both player wrong means.

15. The instructural apparatus of claim 14 having a plurality of correct response means connected in common to one of said second lines connected to a first line following the selected position of the matrix and connected to said code reader for individual energization to indicate the correct response.

16. The instructural apparatus of claim 14 having a manually operable switch connected in a fourth line connected to a third line in the next to the last position of the second matrix to selectively energize the switching means and reset the switching means to the home position.

17. The instructional apparatus of claim 16 having a scoring means having a home position and cyclically operable to score a unit score in response to energization of the scoring means, said cycle start means being a cycle relay connected in circuit through said scoring means and having said contacts connected to a fourth line connected to the home position third line, a timing relay connected in parallel with said projection relay and having contacts connected in one of said fourth lines to establish an automatic cycling of the switching means to the home position after a selected time interval, a correct answer bell, each of said correct answer relays having contacts connected in parallel with the corresponding contacts of the other correct answer relay in a second line connected to first lines in the fifth and seventh positions of the first matrix, said second matrix supplying power directly to said switch means in said fifth and seventh positions said both player wrong means being a relay.

18. An instructional apparatus for simultaneous operation by a plurality of different persons, comprising presentation means for sequentially presenting stimulus information, a plurality of groups of response means, a plurality of separate multiple input selection means for actuating a corresponding response means, each of said multiple input selection means being particularly related to said information whereby selected actuation of a predetermined one of the input selection means of each group is proper and creates a first response and actuation of other of the same input selection means of each group is improper and creates a second response, interlock means responsive to actuation of any one separate input selection means selectively controlling the response means to determine the subsequent establishment of said first and second responses, said presentation means includes a multiple frame film and film projection means for sequentially presenting the film frames and, said frames each having a question and a plurality of responsive answers only one of which is correct, said film carrying a multiple channel coded means with a channel for each answer to indicate said correct answer, a code reader including a plurality of channels coupled to said film channels to read the correct answer coded means and establish a circuit path in the correct answer channel for the question being presented, said input selection means including a first group of individual selection switch means, each selection switch means hqving a pair of contact means with a common pole, one of each pair of contact means being connected to a corresponding code reader channel with the corresponding switch means in said plurality of selection switch means being connected in common to said code reader channel and a second of which is connected in series with the other second contacts each of said response means including a correct answer means connected in series with said second contacts of the corresponding selection switch means, each of said input selection means including a second group of individual selection switch means coupled to said corresponding first group, each of said response means including an incorrect response means connected to the corresponding individual selection switch means of said second group, each of said correct answer means having latching means connected to hold itself in operation and first disable means connected to disable all other correct answer switch means and each of said incorrect answer means having latching means connected to hold itself in operation and disable means connected to disable the corresponding correct answer switch means.

19. An instructional apparatus for simultaneous operation by a plurality of different persons, comprising presentation means for sequentially presenting stimulus information, a plurality of groups of response means, a plurality of separate multiple input selection means for actuating a corresponding response means, each of said multiple input selection means being particularly related to said information whereby selected actuation of a predetermined one of the input selection means of each group is proper and creates a first response and actuation of other of the same input selection means of each group is improper and creates a second response, interlock means responsive to actuation of any one separate input selection means selectively controlling the response means to determine the subsequent establishment of said first and second responses, said presentation means being operable to sequentially present a series of time-spaced bits of stimulus information and a plurality of response means includes a scoring means responsive to proper actuation of said input selection means, said scoring means including a cyclical score reset means, and means connecting said scoring means to said presentation means and said response means to reset the scoring means to a reference position at the start of each series of presentations.

20. The instructional apparatus of claim 19 having a presentation drive means and a visual display means, a starting control means, a game control means, said scoring means including a single cycle control switch means including a home position said start control means and cycle control switch being connected to conjointly control said game control means, a cycling switch means having a plurality of contact positions, said game control means being connected to a first contact position to actuate the switch means to the second position means in said second contact position energizing said presentation drive means, means in the third contact position automatical drive said cycling switch means, means in the fourth contact position supplying a power connection to said response means and said multiple input selection means, a fifth contact position including said response means for selectively energizing said score means, a correct response indicator, a sixth contact position including said indicator and responsive operation of a selected input selection means, and a seventh contact position connected to indicate the correct response and to reset the game control means, and a timing means connected in circuit through said cycling switch means to operatively reset the apparatus to present a further bit of information and related responses after a predetermined period of the presentation of a given bit of information.

21. An instructional apparatus for simultaneous operation by a plurality of different persons, comprising presentation means for sequentially presenting stimulus information, a plurality of groups of response means, a plurality of separate multiple input selection means for actuating a corresponding response means, each of said multiple input selection means being particularly related to said information whereby selected actuation of a predetermined one of the input selection means of each group is proper and creates a first response and actuation of other of the same input selection means of each group is improper and creates a second response, interlock means responsive to actuation of any one separate input selection means selectively controlling the response means to determine the subsequent establishment of said first and second responses, said presentation means including a plurality of proposed responses for the stimulus information including a correct response and a plurality of incorrect responses, each of said response means including a correct response control means and an incorrect response control means, each of said selection means including a corresponding number of given response-related switch means individually connected to actuate the corresponding incorrect and correct response control means, said incorrect response control means including first switch means connected to disable the corresponding correct response control means and second switch means to latch the activated incorrect response control means in a response state, separate operational indicating means for each selection means to indicate that a selection may be made, said incorrect response means including a third switch means connected to disable said indicating means, and a wrong answer selected means connected to the response related switch means and actuated thereby..

22. An instructional apparatus for simultaneous operation by a plurality of different persons, comprising presentation means for sequentially presenting stimulus information, a plurality of groups of response means, a plurality of separate multiple input selection means for actuating a corresponding response means, each of said multiple input selection means being particularly related to said information whereby selected actuation of a predetermined one of the input selection means of each group is proper and creates a first response and actuation of other of the same input selection means of each group is improper and creates a second response, interlock means responsive to actuation of any one separate input selection means selectively controlling the response means to determine the subsequent establishment of said first and second responses, said presentation means being a multiple frame film means having a self-cycling stepping means for sequentially presenting each film frame, each of said frames carrying a bit of stimulus information, a plurality of responses and a code area for each response with one code area different than all others to encode the correct response, said plurality of response means each including separate bank of switches including a different selection switch means for each of said responses, a code reader mounted adjacent the presentation means to read the code areas of each frame as the information and responses are presented, each selection switch means including a single-pole double-throw switch having an output pole connected to actuate the response means and a first contact connected to the code reader and the second contact connected to the pole of another switch in the same bank, and each selection switch means further including an improper response switch having a pole ganged with the output pole and connected to actuate the improper response means if proper output pole is actuated.

23. An instructional apparatus for simultaneous operation by a plurality of different persons, comprising presentation means for sequentially presenting stimulus information, a plurality of groups of response means, a plurality of separate multiple input selection means for actuating a corresponding response means, each of said multiple input selection means being particularly related to said information whereby selected actuation of a predetermined one of the input selection means of each group is proper and creates a first response and actuation of other of the same input selection means of each group is improper and creates a second response, interlock means responsive to actuation of any one separate input selection means selectively controlling the response means to determine the subsequent establishment of said first and second responses, cycle switch means including a plurality of different circuit establishing positions and means to sequentially establish said positions, said switching cyclically energizing said presentation means, said response means and said input selection means to sequentially present a series of different information in time spaced relation, and means responsive to presentation of final information in the series to operatively disconnect said switching means.

24. The instructional apparatus of claim 23, wherein said presentation means is operable to sequentially present a series of time-spaced bits of stimulus information and a plurality of related responses for each bit of stimulus information, each of said plurality of response means includes a scoring means responsive to proper actuation of said input selection means, said scoring means including a cyclical score drive means, establishing a selected score during each cycle means connecting said scoring means to said presentation means and said response means to reset the scoring means to a reference position at the start of each series of presentations, and means in said cycle switch means including a plurality of positions to actuate said drive means and thereby establish a score related to a point in each sequence that a correct response means is actuated.

25. The instructional apparatus of claim 23, wherein visual display means presents said information as a stimulus information and a plurality of proposed responses including correct and incorrect responses, each of said response means including a correct response control switch means and an incorrect response control switch means, a multiple incorrect response control switch means, each of said selection means including a corresponding number of proposed response-related switch means each having a first switch individually connected to actuate the corresponding correct response control switch means and a second switch individually connected to actuate the corresponding incorrect response control switch means and a multiple third switch connected to actuate said incorrect response switch means, said cycle switch means having a series of positions supplying power to said response means and said switch means subsequent to actuation of said presentation means, said correct response control switch means including a first switch coupled to operatively disable the correct response control switch means of the other response means and to a second switch connected to operatively disable said corresponding incorrect response control switch means, said incorrect response control switch means including a third switch coupled to disable the corresponding correct response control switch means and a fourth switch to latch the activated incorrect response control switch means in a response state, means connecting said multiple incorrect response switch means to selectively reset all of said incorrect response control switch means, and reset switch means to selectively reset the several control switch means.

26. An instructional apparatus for simultaneous operation by a plurality of different persons, comprising presentation means for sequentially presenting stimulus information, a plurality of separate multiple input selection means for actuating a corresponding response means, each of said multiple input selection means being particularly related to said information whereby selected actuation of a predetermined one of the input selection means of each group is proper and creates a first response and actuation of other of the same input selection means of each group is improper and creates a second response, interlock means responsive to actuation of any one separate input selection means selectively controlling the response means to determine the subsequent establishment of said first and second responses including a control means establishing the apparatus to present a series of bits of different information, a cycling switch means having a plurality of contact positions including means to scan said contact positions said response control means and said multiple input selection means, each bit of information for the presentation of and sequentially energize the presentation means, circuit means connected to each of said contact positions to energize said control means and including a stop means in a selected contact position, and a coded means connected to operatively actuate the stop means to deenergize said control means and prevent the presentation of information.

27. An instructional apparatus for simultaneous operation by a plurality of different persons, comprising presentation means for sequentially presenting stimulus information, a plurality of groups of response means, a plurality of separate multiple input selection means for actuating a corresponding response means, each of said multiple input selection means being particularly related to said information whereby selected actuation of a predetermined one of the input selection means of each group is proper and creates a first response and actuation of other of the same input selection means of each group is improper and creates a second response, interlock means responsive to actuation of any one separate input selection means selectively controlling the response means to determine the subsequent establishment of said first and second responses, a control matrix including first lines and said second lines interconnected at selected points by unidirectional conducting means, a cycle switch having a cycle switch drive means and having a first switch element sequentially and cyclically supplying power to selected first lines element and sequentially and cyclically connecting first lines to the cycle switch drive means and having a second switch element, said second lines being connected to a power supply for operating said cycle switch drive means and to said presentation means and to said response means for selectively energizing said presentation means and said response means during each position of said switch elements.

28. The instructional apparatus of claim 31 having drive means for said presentation means providing a stepping movement in response to an input control signal, said unidirectional conducting means being diodes, said cycle switch being a stepping switch having a drive coil connected in series drive circuit with a set of normally closed contacts actuated by said drive coil said second lines being connected to energize said presentation means including said drive means, said response means and said selection input means, said first switch element being a first switch bank including a plurality of contacts connected to said first lines and a first movable power contact sequentially and cyclically engaging said contacts, said power contact being connected to a power supply means, said second switch element being a second switch bank including a plurality of second contacts and a second movable contact sequentially and cyclically engaging said second contacts, said second movable contact being connected to said series drive circuit, and a second switching matrix including a plurality of third lines connected to said second contacts and fourth lines connected to a power supply switch means in said fourth lines connected to a power supply, switch means in said fourth lines to selectively energize said coil and establish movement of said first and second movable contacts in accordance with the operation of said response means.

29. The instructional apparatus of claim 27 wherein said presentation means includes a drive means for sequential presentation of stimulus information and related response information, each of said plurality of response means including a correct response means coupled to the input selection means and responsive to a given selection and an incorrect response means coupled to the input selection means and responsive to selection other than said given selection, power switching control means actuated by said response means, means connecting said second lines to said presentation means, said input selection means, said response means and said switching control means to control the energization of said several means and said unidirectional conducting means connecting selected first lines to selected second lines to establish a predetermined transfer of power from said first lines to said second lines during the presentation of each stimulus information and related response information to establish a cycle control for each stimulus information.

30. An instructional apparatus for sequentially presenting stimulus information and response information comprising information carrier presentation means having a drive means for sequential presentation of stimulus information and related response information, input selection means for selecting the response information, a correct response means coupled to the input selection means and responsive to a given selection, an incorrect response means coupled to the input selection means and responsive to selection other than said given selection, a cycle switching means, a plurality of first lines, a plurality of second lines, said cycle switching means having contact means connected to first selected ones of said first lines for sequentially and cyclically supplying power to said first lines, means connecting said second lines to said presentation means, said input means, said response means and said switching means to control the energization of said several means, and unidirectional conducting means to selectively couple the first lines to said second lines to establish a predetermined transfer of power from said first lines to said second lines during the presentation of each stimulus information and related response information.

31. The instructional apparatus of claim 30, wherein said cycle switching means includes said first lines and said scond lines defining a first matrix with said unidirectional conducting means being diodes, said switching means being a stepping switch having a first switch bank defining said contact means coupled to said first lines for sequentially and cyclically supplying power to said first lines and having a second switch bank, a second group of first and second lines define a second matrix, a drive for said cycle switching means, said second switch bank connecting said drive to said first lines of said second matrix, said second lines of said second matrix connected to a power supply and including drive control switch means controlled by said first matrix.

32. The instructional apparatus of claim 30, wherein said drive means for said information carrier presentation means provides a stepped movement in response to an input control signal, said plurality of first lines and plurality of second lines defines a switching matrix with the lines connected by diodes, said switching means is a stepping switch having a drive coil connected in series drive circuit with a set of normally closed contacts actuated by said drive coil, said switching means having a first switch bank including a plurality of contacts connected to said first lines and a first movable contact sequentially and cyclically engaging said contacts, said stepping switch having a second switch bank including a plurality of second contacts and a second movable contact sequentially and cyclically engaging said second contacts, said second movable contact being connected to said series drive circuit, and a second switching matrix including a plurality of third lines connected to said second contacts and fourth lines connected to a power supply, switch means in said fourth lines to selectively energize said coil and establish movement of said first and second movable contacts in accordance with the operation of said response means.

* * * * *

UNITED STATES PATENT OFFICE
CERTIFICATE OF CORRECTION

Patent No. 3,765,105          Dated October 16, 1973

Inventor(s) HAROLD S. MONTGOMERY and ROGER J. BUDNIK

It is certified that error appears in the above-identified patent and that said Letters Patent are hereby corrected as shown below:

| | | | |
|---|---|---|---|
| Column 3, | Line 37, | before "as" insert --- such ---; |
| Column 7, | Line 35, | after "contact" cancel "44" and insert --- 43 ---; |
| Column 13, | Line 5, | cancel "52" and insert --- 53 ---; |
| Column 21, Claim 5 | Line 66, | delete "8" and insert --- 4 ---; |
| Column 31, | Line 27, | delete "31" and insert --- 27 ---; and |
| | Line 29, | cancel "stepping" and insert --- stepped ---. |

Signed and sealed this 17th day of September 1974.

(SEAL)
Attest:

McCOY M. GIBSON, JR.
Attesting Officer

C. MARSHALL DANN
Commissioner of Patents